H. A. CUMFER.
PIPE FITTING.
APPLICATION FILED APR. 3, 1918.
1,349,663.
Patented Aug. 17, 1920.
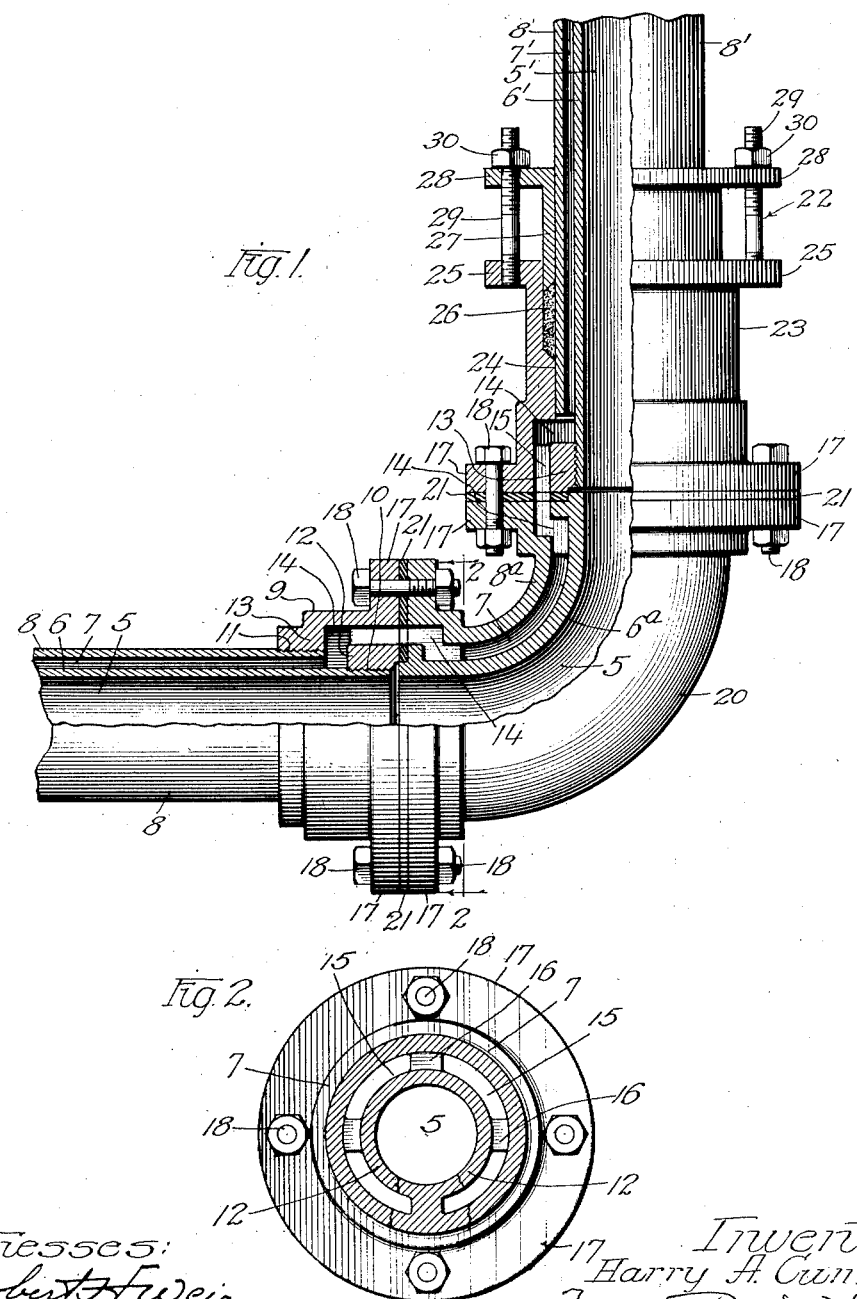

UNITED STATES PATENT OFFICE.

HARRY A. CUMFER, OF CHICAGO, ILLINOIS.

PIPE-FITTING.

1,349,663.

Specification of Letters Patent.   Patented Aug. 17, 1920.

Application filed April 3, 1918.   Serial No. 226,376.

*To all whom it may concern:*

Be it known that I, HARRY A. CUMFER, a citizen of the United States, residing at Chicago, in the county of Cook and State of Illinois, have invented certain new and useful Improvements in Pipe-Fittings, of which the following is a specification.

My invention relates to improvements in pipe fittings and it has more especial reference to fittings for double conduits.

One of the objects of my invention is to provide a flange for connecting interior and exterior sections of parallel pipes together, at their respective ends, by use of a single flange and one set of bolts.

Another object of my invention is to so arrange the confronting edges of the flanges that a single gasket may be used, between adjacent flanges, for both of the communicating conduit units.

And another object of my invention is to make an expansion joint for the outer conduit and a coupling flange for both conduit units, in one integral part.

Other objects of my invention will become readily apparent, to persons skilled in the art, from a consideration of the following description, when taken in conjunction with the accompanying drawing forming a part hereof, wherein—

Figure 1 is an elevation, partly in section, of an elbow, an expansion joint and parts of two pipes, constituting inner and outer, parallel, conduits, connected together with my improved fitting.

Fig. 2 is a transverse section taken on line 2—2 of Fig. 1.

In both views the same reference characters indicate similar parts.

In the specific structure illustrated an inner conduit 5—5' is provided by the inner pipes 6—6' and intermediate connections. The outer conduit 7—7' surrounds the inner pipe 6—6' and is bounded outwardly by the pipes 8—8'. The ends of the pipes 6' and 8', which are shown broken off, are the same as the ends of the pipes 6 and 8 shown complete therebelow, to the left of the elbow.

The pipes 6 and 8 are screwed into the threaded terminals of the flange 9, as at 10 and 11, respectively.

A smaller inner part 12 of the flange, is threaded for the smaller pipe 6 and a spaced-away part 13 is threaded for the pipe 8. Between these parts, 12 and 13, is an annular channel 14, which extends around the inner pipe 6 when the latter is in place, and which is a part of the conduit 7. A plurality of axially extending openings 15 flank the annular channel and terminate at the face of the flange. These openings are separated by bridges 16 to retain the ring 12 in place. When pipes, such as pipes 6 and 8 are to be connected together in straight-away sections, a flange similar to flange 9, is used for the purpose and in a similar manner. The annular flanges 17 are then connected together by a single set of bolts 18.

In the drawings I have shown the conduits made in an integral part with the connecting flanges, as exemplified in the elbow 20. This is much the cheapest and more convenient way to make relatively short fittings or sections, such as for example, as T's, crosses, elbows, and the like.

It is manifest, however, that longer, straighter, double pipe conduits, could be made in the same manner, if desired, instead of making the pipes and the connecting flange in separate parts. In any event, only a single set of bolts will be required to connect adjoining double conduit sections together, and a single gasket 21 will serve for the purpose.

At the upper part of Fig. 1, I have shown an expansion joint 22 for the outer pipe 8'. In this joint the flange fitting 9 is extended into a cylindrical part which has a bore 24 to neatly receive the adjacent end of the larger pipe 8'. The cylindrical part 23 terminates in another flange 25 and it is counter-bored at the latter end to receive packing material 26.

A gland 27 fits neatly over the smooth end of the pipe 8' and is provided with a flange 28 to receive threaded studs 29 that project from the confronting face of the flange 25. Nuts 30, screw over the threaded ends of the studs 29 to force the gland 27 into the cylinder 23 to tighten the packing 26.

An expansion joint is necessary, in a double-conduit system, to be included in the outer or inner pipe thereof, to compensate for the unequal expansion and contraction of the pipes.

While I have herein disclosed a single embodiment of my invention it is to be understood that I do not consider the invention to be limited to the precise disclosure and that while I have used the term connecting flange in the claims, I intend the term, in some instances, to include a flange fitting as a single entity or as a part of a double pipe system, whether the pipes are separate or form integral parts of the fitting.

Having described my invention, what I claim is:—

1. A flanged pipe coupling having in combination a member provided with two spaced apart threaded openings, for insertion of threaded inner and outer pipes and another member having a threaded opening for insertion of the other end of the inner pipe and having an axial extension to overlie the other end of the outer pipe; a gland coöperating with said extension and said outer pipe to provide a packing joint between the extension and the outer pipe and bolts to hold the joint members together.

2. A double pipe conduit system having a plurality of double pipe units, each unit having a double pipe coupling flange on one end and an expansion joint on the other end, said expansion joint terminating in a flange for connection with the coupling flange of the adjacent unit.

In testimony whereof I hereunto set my hand.

HARRY A. CUMFER.